United States Patent [19]

Novak et al.

[11] 4,292,220

[45] Sep. 29, 1981

[54] ADDITION POLYMER COMPRISING AIR-CURABLE ALKYL DIAMIDE

[75] Inventors: Ronald W. Novak, Chalfont, Pa.; Leslie R. Wolf, Bolingbrook, Ill.

[73] Assignee: Rohm and Haas Company, Philadelphia, Pa.

[21] Appl. No.: 106,061

[22] Filed: Dec. 20, 1979

[51] Int. Cl.$^3$ .................. C08F 220/54; C08F 220/60
[52] U.S. Cl. .................. 260/23 AR; 260/185; 260/23 R; 260/42.43; 525/295; 525/296; 526/292.2; 526/298; 526/306
[58] Field of Search .................. 525/296, 295; 260/23 AR, 23 R, 18 S, 42.43; 526/292, 298, 306

[56] References Cited

U.S. PATENT DOCUMENTS

| | | | |
|---|---|---|---|
| 3,428,588 | 2/1969 | Skoultchi et al. | 260/23 R |
| 3,590,016 | 6/1971 | Hopwood | 260/29.6 |
| 3,591,544 | 7/1971 | Hopwood | 260/29.6 |
| 3,759,915 | 9/1973 | Kottke | 260/41 R |
| 3,786,020 | 1/1974 | Emmons | 260/41 A |
| 3,919,146 | 11/1975 | Emmons | 260/23 AR |
| 3,924,046 | 12/1975 | Ribka et al. | 526/306 |
| 4,035,319 | 7/1977 | Haas | 526/306 |
| 4,206,294 | 6/1980 | Simms | 525/296 |

FOREIGN PATENT DOCUMENTS 1010760 11/1965 United Kingdom ............... 525/296

*Primary Examiner*—Ronald W. Griffin
*Attorney, Agent, or Firm*—Harold L. Greenwald

[57] ABSTRACT

The specification discloses a polymer of ethylenically unsaturated monomers wherein the polymer comprises diamide mer units having pendant unsaturated, air-curable alkyl groups. Methods of making and using the polymers and articles made therefrom are taught. The polymer may be used in coating, bonding or adhering to substrates. Of particular importance are uses in paint compositions and in caulk compositions. The air-curable alkyl diamide mer unit is derived from an unsaturated drying oil. Aqueous coating compositions are disclosed in which the polymer is an ammonia or amine salt, in solution, and is either the sole polymeric vehicle or is combined with a water insoluble polymer latex.

47 Claims, No Drawings

ADDITION POLYMER COMPRISING AIR-CURABLE ALKYL DIAMIDE

This invention concerns a polymer, its preparation, several methods for using the polymer and articles prepared thereby. The polymer of this invention is prepared by the reaction of a carboxylic acid containing polymer with an N-(β-aminoethyl) amide wherein the amide is a drying oil fatty amide. Alternatively, the polymer of the instant invention can be prepared by reacting the carboxylic acid containing prepolymer with an imidazoline substituted in the 2 position by an unsaturated, air-curable (i.e., drying) alkyl group. The polymer is an air-drying, crosslinkable material useful as a coating binder or adhesive in conjunction with either a hard or soft substrate. The polymer of this invention is an addition polymer of ethylenically unsaturated monomers wherein the polymer comprises diamide mer units of the formula

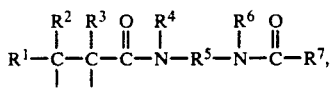

$R^1$ and $R^3$ individually being H, lower alkyl, —COOR$^8$, —CONH$_2$, —CH$_2$COOR$^9$, —CN or halogen;

$R^2$, $R^4$, $R^6$, $R^8$, and $R^9$ individually being H or lower alkyl;

$R^5$ being alkylene having two to 18 linear carbon atoms between the two nitrogen atoms; and $R^7$ being unsaturated, air-curable alkyl.

In one group of embodiments this invention relates to caulking, sealing, or putty compositions, in another group to coatings.

Polymers have been described in the past in which air-curable alkyl groups are pendent from addition polymers of ethylenically unsaturated monomers in which the connection between the alkyl group and the polymer backbone is by means of one amide linkage and one ester linkage (amide-ester grouping). Polymers containing such amide-ester linkages are described by Hopwood in U.S. Pat. Nos. 3,590,016 and 3,591,544. The Hopwood patents show the use of the polymers to form a film and a coating. Kottke teaches the use of such amide-ester material in a caulking composition. Others have taught polymers in which the air-curable alkyl is attached to the polymer backbone by means of two ester groups (ester-ester linkage), such as Skoultchi et al (U.S. Pat. No. 3,428,588) who prepared a water soluble resin composition having air drying properties, and Emmons (U.S. Pat. Nos. 3,786,020 and 3,919,146) who teaches ester-ester linkages in polymers useful in caulking or sealing compositions.

BRIEF SUMMARY OF THE INVENTION

The polymer of this invention is an addition polymer of ethylenically unsaturated monomers wherein the polymer comprises diamide mer units of the formula

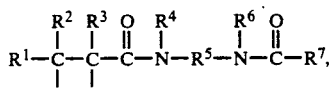

$R^1$ and $R^3$ individually being H, lower alkyl, —COOR$^8$, —CONH, —CH$_2$COOR$^9$, —CN or halogen;

$R^2$, $R^4$, $R^6$, $R^8$, and $R^9$ individually being H or lower alkyl;

$R^5$ being alkylene having two to 18 linear carbon atoms between the two nitrogen atoms; and $R^7$ being unsaturated, air-curable alkyl.

This polymer can be prepared by the reaction of an N-(βaminoethyl) amide and the carboxylic acid containing polymer according to the following equation:

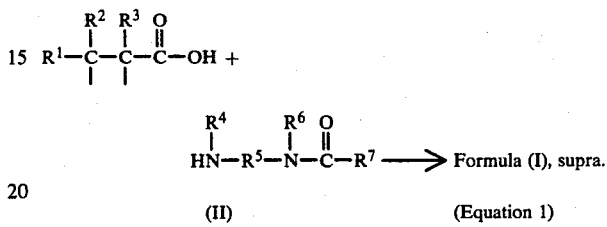

(Equation 1)

A second way of preparing the air drying polymer is by reacting a 2-substituted imidazoline and a carboxylic acid containing polymer according to the equation:

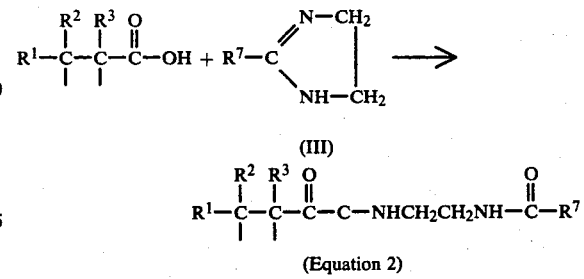

(Equation 2)

The air-curable polymer has many uses, particularly in coating, binding or adhesive compositions. Preferred embodiments include paint formulations and caulk formulations.

DETAILED DESCRIPTION

The air-curable polymer of the instant invention is a polymer of ethylenically unsaturated monomers wherein the polymer comprises diamide mer units of the formula

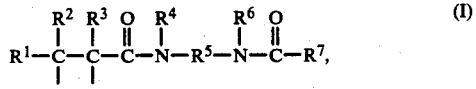

(I)

$R^1$ and $R^3$ individually being H, lower alkyl ($C_1$-$C_8$, preferably $C_1$-$C_4$), —COOR$^8$, —CONH$_2$, —CH$_2$COOR$^9$, —CN or halogen; of which $R^1$ is preferably H and $R^3$ is preferably CH$_3$. $R^2$, $R^4$, $R^6$, $R^8$, $R^9$ and $R^{10}$ (infra) individually are H or lower alkyl ($C_1$-$C_8$, preferably $C_1$-$C_4$, more preferably methyl) with $R^2$, $R^4$ and $R^6$ being preferably H. $R^5$ being alkylene comprising 2 to 18 carbon atoms in a linear linkage between the two nitrogen atoms and is preferably $(CR_2^{10})_n$ wherein n is an integer of 1 to 5, preferably 1, 2 or 3. $R^7$ is unsaturated air-curable alkyl preferably having up to 22 carbon atoms.

There are many types of caulking compounds including those in which the binder is such that they are surface drying. Surface drying includes drying by oxidation or by solvent release and is advantageous in achieving a clean surface which does not pick up dirt. The permanently plastic binders comprise another category. Other types of caulking compounds are those which are catalytically cured and those which are heat convertible. A disadvantage of the drying oil type, which drys by oxidation, is that ultimately the drying reaction is carried to such an extent that the products become brittle and sometimes extremely hard. This makes replacement of the caulk very difficult.

The present invention provides a combination of types of cure and provides a combination of properties which could be said to be a permanently plastic product which cures by an oxidation reaction of unsaturated groups on the permanently plastic polymer, and preferably also by solvent evaporation. Basically, the product comprises an addition polymer backbone such as an acrylic backbone which has groups attached thereto through amidation of carboxyl groups on the backbone by a fatty acid amido-amine or an imidazoline derived therefrom, the fatty acid having an unsaturated group curable by a drying or oxidative mechanism. The binder for the caulking compound has units of the following structure:

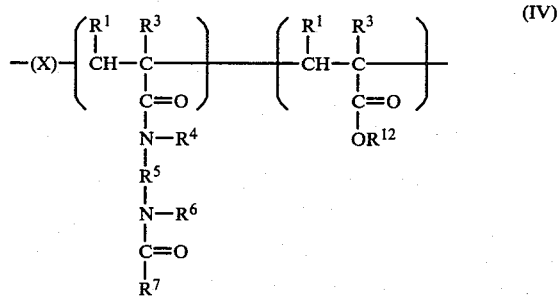
(IV)

wherein the symbols previously used have the same meaning as given above.

Examples of $R^5$ are isopropylene, propylene, ethylene, and decamethylene; examples of $R^4$ and $R^6$ are H, methyl, hexyl, and octyl.

$R^7$ is an unsaturated air curable alkyl radical, preferably having from about 10 to about 22 carbon atoms.

$R^{12}$ is at least one of H and one or more alkyl or substituted alkyl radicals having from one to 20 carbon atoms, examples being methyl, hexyl, cyclohexyl, meristyl and octyl, at least a portion of $R^{12}$ being H to give free carboxyl groups.

X is derived from at least one other optional copolymerizable vinyl monomer (defined hereinbelow) other than the one or ones from which the right side parenthetical group

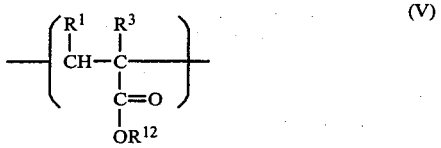
(V)

is derived. It is to be understood that when $R^3$ and/or $R^1$ contain free carboxyl groups (—COOH), the amido-amine or imidazoline can react therewith via Equations 1 or 2 to give pendant diamide groups similar in function to the center parenthetical group.

The units in parentheses are in any order, in the polymer. Examples of $R^3$ and $R^1$ are:

| $R^3$ | $R^1$ | Acid for Carboxyl Source |
|---|---|---|
| H | H | acrylic |
| $CH_3$ | H | methacrylic |
| H | COOH | maleic, fumaric |
| H | $COONH_2$ | maleamic |
| Cl | COOH | chloromaleic |
| $CH_2COOCH_3$ | H | methyl acid itaconate |
| $CH_2COOH$ | H | itaconic |
| $CH_2COOH$ | COOH | aconitic |
| H | $COOCH_3$ | half ester of maleic |

The matter in the right-side parenthetical group, of IV, represents that portion of the addition polymerized polymer backbone having free carboxyl groups as well as carboxyl groups which are esterified by the various alcohols conventionally used. The optional portion —X—, is derived from any of the well-known unsaturated addition polymerizable vinyl monomers, defined below, in addition to those which give units of formula V, above.

The backbone polymer, before amidation by the amido-amine, has the formula

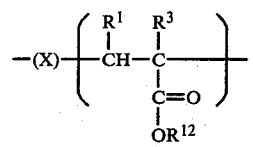

and the amido-amine and imidazoline are as given in Equations 1 and 2 respectively. The symbols used have the same meaning as given above.

An essential characteristic of the ultimate elastomeric polymer, obtained by amidifying pendant —COOH groups of the backbone by the reactions of Equations 1 or 2, as concerns caulks, is that there be less than about 10 percent, and more preferably there be about 1 to 5 percent, on a weight basis, of the groups represented by formula I.

If this criterion is not observed, over a long period of time the caulk may become too brittle or hard for proper expansion and contraction of abutting surfaces in contact with a single caulk bead, or the bead may become so hard as to preclude easy repair. Without a silane of the type used in solvent-based caulks, wet adhesion on upright surfaces may be defective, especially if more than 5 percent of said groups by weight is present. For proper adhesion of the caulk and for other advantageous properties, it is essential to have free carboxyl groups along with the pendant amide amide groups.

The backbone polymer is a water-insoluble vinyl polymer containing the requisite proportion of carboxyl (—COOH) groups as described herein. The backbone polymers per se are well known in the art and form no part of the present invention.

The proportions of monomers in the backbone are such that there is at least 0.25% and no more than 40%, preferably less than 25%, of unsaturated carboxylic acid, by weight, in the monomers going into said backbone polymer. An especially preferred range is from about 1% to 5%, and the optimum is considered to be in the range of 1.5% to 3.5%. In reacting the unsaturated fatty amide-amine or imidazoline with free carboxyl (—COOH) groups in the backbone polymer, the mole ratio of —COOH:amido-amine or imidazoline is in the range of from 1:0.2 to 1:0.9, preferably from 1:0.3 to 1:0.7. A particularly useful range is from 1:0.4 to 1:0.6. It is essential to have a substantial proportion of free carboxyl groups for proper adhesion and, for maximum long term flexibility necessary in the cured caulks, a minimum of the drying oil functionality. Thus in the final polymer there is generally no more than about 30%, preferably less than 20% mer units comprising carboxylic acid groups or salts thereof.

In the backbone, hard (high $T_g$) monomers such as styrene or methyl methacrylate are useful in the range of 0 to 90 percent, preferably 5 to 25 percent, with soft (low $T_g$) monomers such as ethyl or butyl acrylate forming from about 75 percent to about 99.75 percent of the total monomers, preferably 70 to 94 percent.

The preferred backbone polymers are those of vinyl addition polymer type, including as an essential component, the $\alpha,\beta$-unsaturated carboxylic acid, preferably acrylic acid or methacrylic acid. Other suitable copolymerizable acids are named in U.S. Pat. Nos. 3,098,760 and 3,261,796, additional examples being given below.

To amplify, the unsaturated carboxylic acid may be a simple monocarboxylic acid, a polycarboxylic acid, or may be a partial ester or half amide of such $\alpha,\beta$-unsaturated polycarboxylic acids. Examples of copolymerizable ethylenically unsaturated monocarboxylic or polycarboxylic acids are sorbic, acryloxyacetic, acryloxypropionic, cinnamic, vinyl furoic, -chlorosorbic, methacryloxypropionic, methacryloxyacetic, p-vinylbenzoic, acrylic, methacrylic, maleic, fumaric, aconitic, atropic, crotonic, and itaconic acid, or mixtures thereof, with itaconic acid and the $\alpha,\beta$-unsaturated monocarboxylic acids, particularly methacrylic acid and acrylic acid, being preferred. Other copolymerizable acid monomers include the alkyl half esters or partial esters of unsaturated polycarboxylic acids such as of itaconic acid, maleic acid, and fumaric acid, or the partial amides thereof. Preferred half esters are the lower alkyl ($C_1$-$C_6$) esters such as methyl acid itaconate, butyl acid itaconate, methyl acid fumarate, butyl acid fumarate, methyl acid maleate, and butyl acid maleate. Such partial esters and partial amides are considered to be "$\alpha,\beta$-unsaturated monocarboxylic acids," and the term as used herein includes such esters and amides.

The term "vinyl monomer" as used herein means a monomer comprising at least one of the following groups:

| vinylidene | 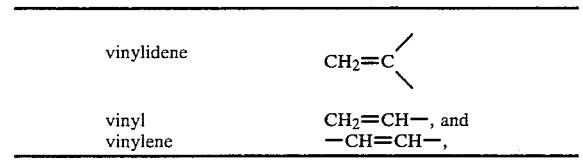 |
| vinyl | $CH_2=CH-$, and |
| vinylene | $-CH=CH-$, | whether homopolymerizable or not, giving units corresponding to X and to formula II. Examples are the $\alpha,\beta$-ethylenically unsaturated monocarboxylic acids and esters and amides thereof, $\alpha,\beta$-ethylenically unsaturated aldehydes, $\alpha,\beta$-ethylenically unsaturated dicarboxylic acids and esters, amides, half esters, and half amides thereof, $\alpha,\beta$-ethylenically unsaturated nitriles, hydrocarbons such as $\alpha$-olefins, conjugated diolefins, vinylaryl compounds, vinyl alkyl ethers, vinyl halides, vinylidene halides, vinyl sulfides, vinyl acyloxy compounds (esters of saturated carboxylic acids and ethylenically unsaturated alkanols), vinyl amines and salts thereof, vinyl ureido monomers, vinyl compounds having heterocyclic nitrogen-containing (HN<) groups, and halogen, hydroxyalkyl, or aminoalkyl substituted derivatives thereof, whether homopolymers or copolymers. The vinyl polymers and methods for their preparation form no part of the present invention, and any such polymer may be treated in accordance with the present invention. For examples of well-known vinyl polymers and methods of preparing the same, see "Polymer Processes," Schildnecht, Interscience, N.Y. (1956), pp. 111–174. Mixtures of different polymers are useful.

Specific examples of suitable monomers which may be copolymerized to obtain the water-insoluble polymers for use according to the invention in addition to the unsaturated acid monomers and esters thereof with alkanols having one to 20 carbon atoms, such as methanol, ethanol, butanol, pentadecanol and the like, are acrolein, methacrolein, ethylene, propylene, isobutene, butadiene, isoprene, chloroprene, styrene, vinyltoluene, vinyl methyl ether, vinyl isobutyl ether, vinyl chloride, vinyl bromide, vinylidene chloride, vinyl sulfide, vinyl acetate, vinyl propionate, the vinyl pyridines, primary amino compounds such as $\beta$-aminoethyl vinyl ether, aminopentyl vinyl ether, secondary amino-containing compounds such as secondary amyl t-butyl aminoethyl methacrylate, tertiary amino-containing compounds such as t-dimethylaminoethyl methacrylate, and the allied amine salts as the chloride or hydroxide, ureido monomers such as are disclosed in U.S. Pat. Nos. 2,881,155 to Hankins, 3,300,429 to Glavis and Keighly, and 3,356,627 to Scott, examples being $\beta$-ureidoethyl acrylate, $\beta$-(N,N'-ethyleneureido)ethyl acid maleate, $\beta$-ureidoethyl vinyl ethers, N-vinyl-N,N'-ethyleneurea, N-vinyloxyethyl-N,N'-ethylene urea, N-methacrylamidomethyl-N,N'-ethyleneurea, and N-dimethylaminoethyl-N'-vinyl-N,N'-ethyleneurea, -hydroxyethyl methacrylate, N-hydroxyethylacrylamide, N-methylolacrylamide, and N-(dimethylaminoethyl)-acrylamide. Copolymers, and graft, block, or segmented polymers are included. Conventional methods of obtaining the backbone polymers are utilized.

Preferred vinyl monomers in addition to the acid, include one or more of an ester of an $\alpha,\beta$-unsaturated carboxylic acid, or, when those from which x is derived are used, an unsaturated nitrile, a vinyl halide, a vinylidene halide, a vinyl aromatic, a vinyl alcohol ester, or an unsaturated hydrocarbon.

An important property of the backbone polymer is the $T_g$ thereof, and consequently the selection of monomers and proportions thereof depends upon their influence on the $T_g$. For caulking, sealing or putty compositions the $T_g$ of the polymer must be below 10° C., preferably below 0° C. (i.e., it must give a rubbery product) and is more preferably below $-10°$ C. The modified backbone polymer containing the pendant amide-amide groups must also have the same $T_g$ requirements. "$T_g$" is a conventional criterion of polymer hardness and is described by Flory, "Principles of Polymer Chemistry," pp. 56 and 57 (1953), Cornell University Press. See also "Polymer Handbook," Brandrup and Immergut, Second Edition Sec. III, pp. 139-192 Wiley-Interscience (1975). While actual measurement of the $T_g$ can be used it may be calculated as described by Fox, Bull.

Am. Physics Soc. 1,3, p. 123 (1956). Examples of the $T_g$ of high molecular weight homopolymers and the inherent $T_g$ thereof which permits such calculations are as follows:

| Homopolymer of | $T_g$ °C. |
| --- | --- |
| ethyl acrylate | −22 |
| isobutyl acrylate | −43 |
| n-butyl acrylate | −54 |
| 2-ethylhexyl acrylate | −85 |
| methyl methacrylate | 105 |
| hydroxyethyl methacrylate | 55 |
| n-butyl methacrylate | 20 |
| isodecyl methacrylate | −41 |
| lauryl methacrylate | −65 |
| acrylic acid | 105 |
| styrene | 100 |
| vinyl acetate | 30 |
| acrylonitrile | 96 |
| vinyl chloride | 81 |

As is known, for a given number of carbon atoms in the alcohol moiety, the extent and type of branching markedly influences the $T_g$, the straight chain products generally giving the lower $T_g$. These calculated $T_g$ values are the relevant relative $T_g$ values of low molecular weight polymers as well. These or other monomers are blended to give the desired $T_g$ of the copolymer.

The polymeric backbone is desirably obtained by solution polymerization of one or more of the ethylenically unsaturated acids with other unsaturated monomers including, among the more preferred vinyl monomers, the esters of acrylic acid or methacrylic acid with benzyl alcohol, phenol, or a saturated monohydric aliphatic alcohol, especially an alkanol, having one to 18 carbon atoms, such as cyclopentanol, cyclohexanol, methanol, ethanol, n-propanol, isopropanol, n-butanol, methoxyethanol, ethoxyethanol, methoxyethoxyethanol, ethoxy-ethoxyethanol, isobutanol, sec-butanol, tert-butanol, any of the pentanols, hexanols, octanols, decanols, dodecanols, hexadecanols, and octadecanols, bearing in mind the required $T_g$ and acid monomer. Other preferred comonomers include acrylonitrile, methacrylonitrile, acrylamide, methacrylamide, the N substitution products of these amides, vinyl acetate, styrene, vinyl toluene (o, m, or p), vinyl chloride or vinylidene chloride, to give the X in the foregoing formula. Blends of copolymers may be used.

High molecular weight polymers, e.g., 10,000 to several million, obtained by solution polymerization or other methods, and of water-insoluble character when in acid form, are used as the backbone polymer. Preferably, the backbone polymer has a molecular weight of 10,000 to 600,000 or more.

The substrates with which the invention is concerned are of all types, including siliceous substrates such as glass sheets, fiberglass textiles, asbestos sheets, asbestos cement products, concrete, stone, stucco, slate, sandstone, granite, ceramics, and porcelain; also fiber reinforced plastic articles such as canoes, boathulls, or other formed articles made out of fiber-glass reinforced polyesters or other plastic materials; metals such as aluminum, steel, iron, brass; wood and other structural materials; metal oxide layers such as those of aluminum oxide and iron oxide; leather; textiles of cellulose such as of cotton, linen, silk, wool, rayon, cellulose esters such as cellulose acetate, nylons, polyesters such as polyethylene glycol terephthalate, acrylonitrile polymers, vinylidene chloride polymers and other vinyl or acrylic ester polymers; films, pellicles, sheets and other shaped articles of various plastic systems such as of cellulose ethers or esters including hydroxyethyl cellulose, methyl cellulose, cellulose acetate, cellulose acetate butyrate, polyesters such as polyethylene glycol terephthalate, nylons, vinyl chloride or vinylidene chloride polymers and copolymers, methyl methacrylate polymers and copolymers, aminoplast or phenoplast resin, organopolysiloxane resins or rubber.

The caulks of the present invention are particularly valuable in that they can be used directly on any of the substrates without the need of a priming coat.

The solvents used in the polymerization may be such organic solvents as benzene, toluene, xylene, solvent naphthas of aliphatic, aromatic, or naphthenic type, such as mineral spirits, acetone, dioxane, etc. Of course, other modes of polymerization can be used. The amount of solvent in the final caulk is from 0 percent to 30 percent based on total weight. Preferably, it is from 5 percent to 15 percent.

The fillers are present in an amount of from 0 percent to 90 percent by weight of the total solids in the composition depending upon the consistency desired, the presence or absence of thickening agents, the amount and identity of solvent utilized, and so forth. Suitable fillers include calcite, limestone, mica, talc, asbestos fiber or powder, diatomaceous earth, barytes, alumina, slate flour, calcium silicate, clay, colloidal silica, magnesium carbonate, magnesium silicate, and so on. The amounts of solvent, if any, filler, and polymer solids are such as to give the caulking composition a dough-like consistency.

Among the drying oils from which the drying fatty alkylamido-amine is derived are linseed, tung, tall, safflower, isano, soya, dehydrated castor, maleinized or fumarized linseed, oiticica, palm, peanut, corn, walnut, menhaden, dehydrated castor, and cottonseed oils, and similar oils, as well as acids not derived from drying oils and of a synthetic origin, with a carbon chain preferably of about 20 carbon atoms or less and having unsaturation therein which can be caused to air cure in a manner analogous to linseed oil. The preferred oils are those which contain oleic and linoleic acids or linoleic and linolenic acids as the predominant ones.

Preparation of (1) the drying fatty alkyl amido-amine, (2) the imidazoline and (3) the polymer having pendant air-curing fatty alkyl groups joined to the backbone by amide-amide groups are taught in the examples below.

Any of the conventional driers or siccatives, such as the linoleates, naphthenates, and resinates of cobalt, zirconium, manganese, lead, cerium, chromium, iron, nickel, uranium, and zinc are suitable. The amount of drier based on the weight of the amido-amine copolymer can be as low as 0.01 percent to as high as 3 percent or more. Best results are obtained with combinations of driers, particularly zinc naphthenate and cobalt naphthenate in quite small amounts, for example, from 0.01 percent to 0.5 percent of the zinc naphthenate together with 0.01 percent to 0.1 percent cobalt naphthenate are particularly useful. The amount of drier utilized should be such as to minimize dirt pickup by the finished caulk. It is helpful, in some cases, to utilize a silane to improve wet adhesion to glass by the caulk and also, at times, to utilize plasticizers for providing low temperature flexibility, for example, at −15° F. Suitable silanes include vinyltriethoxysilane, γ-methacryloxypropyltrimethoxysilane, γ-mercaptopropyltrimethoxysilane, γ-glycidoxypropyl-trimethoxysilane, β-(3,4-epoxycyclohexyl)ethyltrimethoxysilane, γ-aminopropyltriethoxysilane, and N-(dimethoxymethylsilylisobutyl)ethylenediamine. The silane concentration may be between about 0.05 percent and 0.5 percent. Higher amounts may be used but do not result in proportional improvements in adhesion. Suitable plasticizers include oil-modified sebacic acid alkyds, unmodified sebacic acid alkyds, oil-modified maleic polyesters, etc. It is preferred to use "internal" plasticization by means of soft monomers in the backbone; this provides a product which can be used with less solvent, thus minimizing shrinkage.

Typical uses for the caulk are: A glass-block window is mounted in a wood frame within the opening in a stone wall of a house. The joint between the wood frame and the stone wall and the joint between the peripheral edge of the glass-block assembly and the wood frame are filled with the caulking composition. Aluminum-glass joints are also caulked. The caulk seals remain intact on aging and weathering.

In other embodiments this invention concerns a polymer and the method of using the same to prepare articles of manufacture, the composition comprising a water-soluble salt of a polymer containing pendent groups derived from an unsaturated drying oil fatty alkyl amide-amine, carboxy groups, carboxy ester groups and optionally the residues of other unsaturated addition polymerizable monomers, the carboxy units being present in a critical amount and the polymer having a critical glass transition temperature, molecular weight and the like. The groups derived from the amido-amine have the structure of formula I given above.

The soluble polymer is used in aqueous coating compositions, one utility being as the sole vehicle or binder. Another use of the soluble polymer is in aqueous latex paints in which a large part of the vehicle is the water insoluble polymer of the latex.

For use in aqueous coatings certain parameters and features of the polymer are critical for utilization of the polymer as a water-soluble air-curing material. The finished coating polymer must have a $T_g$ of below about 65° C., preferably below 60° C. The calculated $T_g$ of the prepolymer or backbone polymer, before amidification by the amido-amine or imidazoline to give units of Formula I, supra should be below about 50° C., although it can be up to 85° C., if large quantities of the amide are present.

In Formula IV the units in brackets are in any order, portions of the $R^{12}$ radicals being H in a sufficient number of units to provide the coatings polymer with a carboxy content of 0.5-6 meq/g. of polymer solids. This quantity of carboxy groups being sufficient, when in the form of salt groups with amine or ammonia, to confer water solubility upon the polymer. The amount of carboxy-containing units of Formula IV wherein $R^{12}$ is H being up to 40 parts by weight of the total polymer and preferably not less than 5 parts. Preferably a portion of the radical $R^{12}$ is at least one aliphatic or cycloaliphatic radical whereby said portion is derived from at least one ester which when homopolymerized gives a polymer having a $T_g$ of between −90° C. and 120° C., said ester units forming up to 90 parts by weight of the polymer; the polymer having between about 5 and 60 parts, preferably between about 10 and 40 parts by weight of units of the Formula I, supra, wherein the groups are as identified above, any balance of the polymer being the units of -X- of addition polymerized ethylenically unsaturated monomers other than said units of Formulas V and I, the total parts of all said units being 100, the Mv of the polymer being between about 5,000 and 200,000 the $T_g$ of a cured film of the polymer being between about −20° C. and 80° C., the Tukon(Knoop) Hardness of the cured film being between about 0.2 and about 15, in which the composition optionally includes a metal compound drier in an amount up to 0.5%, on a metal basis, of the total polymer weight in the composition, applying a coating of the solution to a substrate, and drying and curing said coating in the presence of air. Preferably, the coating is from 0.1 mil to 10 mils in thickness, when dry.

The description of the polymer in terms of the unit -(-X-)-, examples of $R^3$ and $R^1$, the source acid for the carboxyl, the arrangement of mer units in the polymer and the description of the backbone polymer are the same as for the caulk embodiment above.

Preferred compositions for coatings contain polymer units of:

(a) 0–50, preferably 10–50 parts by weight of a monomer selected from esters of acrylic acid or methacrylic acid, which when homopolymerized gives a polymer having a $T_g$ of between about 0° C. and −90° C., preferably below −10° C.

(b) 20–70 parts by weight of a monomer selected from esters of acrylic acid or methacrylic acid, vinyl aromatic hydrocarbons and unsaturated nitriles which when homopolymerized gives a polymer having a $T_g$ between about 20° C. and 120° C., preferably between about 50° C. and 120° C.

(c) 5–30, preferably 5—20, more preferably 8–15 parts of an ethlenically unsaturated carboxylic acid, optionally with up to 30, preferably 0–20 parts of a different ethylenically unsaturated monomer which confers hydrophilicity to the polymer and enhances its solubility in aqueous liquids, the quantity of ethlenically unsaturated acid being between about 0.6 to 4.5 preferably from 0.6 to 2.5 meq/g. of polymer, and (d) 10–50, preferably 15–50 parts by weight of units of Formula I, and the total of (a), (b), (c), and (d) being 100.

Still more preferably, the polymer is one wherein:

(a) is selected from one or more of ethyl acrylate, butyl acrylate, 2-ethylhexyl acrylate, sec-butyl acrylate, isobutyl acrylate, and isopropyl acrylate, (b) is selected from one or more of methyl methacrylate, styrene, ethyl methacrylate, acrylonitrile, butyl methacrylate, isobutyl methacrylate, and vinyl toluene, (c) is selected from one or more of acrylic acid, methacrylic acid, maleic acid, and itaconic acid, and is present in an amount of from 8 to 20 parts, optionally with up to 20 parts of one or more of the hydrophilic monomers, hydroxyethyl or hydroxypropyl (meth)acrylate (i.e., acrylate or methacrylate), and (d) is present in the amount of between about 20 and 50 parts, the polymer consisting essentially of (a), (b), (c), and (d), and in which the Mv is between about 10,000 and 200,000 preferably 20,000 and 80,000, and more preferably between about 30,000 and 50,000.

In a preferred polymer, in Formula I, n is 2, $R^4$ and $R^6$ are —H, —CH$_3$, or —CH$_2$CH$_3$, and $R^7$ is the alkyl residue of one or more of the drying oil acids selected from tung oil acid, linseed oil acids, dehydrated castor oil acids, safflower oil acids, conjugated safflower oil acids, soybean oil acids and oiticica oil acids. An especially preferred combination of unsaturated drying oil acids are 50–50% of the acids of dehydrated castor oil, safflower oil, conjugated safflower oil, or soybean oil mixed with 10–50% by weight of the acids from tung oil.

It is possible to utilize a single acrylate or methacrylate ester, there being no necessity to use a combination if the suitable hardness and glass transition temperature can be obtained otherwise. An example of a polymer of this type is one which contains polymerized units consisting essentially of:

(b) 45–90 parts by weight of butyl methacrylate (c) 5–15 parts of an ethylenically unsaturated carboxylic acid, the quantity of ethylenically unsaturated acid being between about 0.6 and 2.5 meq/g. of polymer, optionally with up to 20 parts of a different ethylenically unsaturated monomer which confers hydrophilicity to the polymer and enhances its solubility in aqueous liquids, and (d) 10–50 parts by weight of units of Formula I and the total of (b), (c), and (d) being 100.

The preferred backbone polymers are of the same type and employ the same monomers as those of the caulk embodiments, supra. For coatings, preferred vinyl monomers, in addition to the acid, include one or more of an ester of an $\alpha,\beta$-unsaturated carboxylic acid, or, when those from which X is derived are used, an unsaturated nitrile, a vinyl halide, a vinylidene halide, a vinyl aromatic, a vinyl alcohol ester, or an unsaturated hydrocarbon. Particularly preferred comonomers include acrylonitrile, methacrylonitrile, vinyl acetate, styrene, vinyl toluene (o, m, or p), vinyl chloride or vinylidene chloride, to give the X in the foregoing formula. Blends of copolymers may be used.

The products of the present invention are particularly valuable in that they usually can be used directly on any of the substrates without the need of a priming coat. The coating embodiments are applied to any substrates and are particularly appropriate for the same substrates as those on which the caulk embodiments are used; listed above.

Preferred solvents for polymers to be used in coatings are the monoalkyl ($C_1$–$C_4$) ethers of ethyene glycol, diethylene glycol, or propylene glycol, sold under the trademarks "Carbitol", "Cellosolve", and "Propasol". The amount of solvent in the polymer is from 0% to 80% based on polymer solids, preferably from 10% to 65%.

Any of the conventional driers or siccatives, and inorganic acid salts described above can be used. $Co^{++}$ as cobaltous acetate is also useful, alone or with compounds providing $Mn^{++}$, $Zn^{++}$, or $Pb^{++}$.

The materials of the invention are particularly useful as additives for latexes. Suitable latexes are aqueous addition polymer dispersions, generally obtained most conveniently by direct emulsion polymerization. The most important of these dispersions used in making water-based paints are polymers including homopolymers and copolymers of: (1) vinyl esters of an aliphatic acid having 1 to 18 carbon atoms, especially vinyl acetate; (2) acrylic acid esters and methacrylic acid esters of an alcohol having 1 to 18 carbon atoms, especially methyl acrylate, ethyl acrylate, butyl acrylate 2-ethylhexyl acrylate, methyl methacrylate, ethyl methacrylate and butyl methacrylate; and (3) mono- and diethylenically unsaturated hydrocarbons, such as ethylene, isobutylene, styrene, and aliphatic dienes such as butadiene, isoprene, and chloroprene.

Poly(vinyl acetate) and copolymers of vinyl acetate with one or more of the following monomers: vinyl chloride, vinylidene chloride, and one or two of the acrylic acid esters mentioned above, are well known as the film-forming component of aqueous base paints. Similarly copolymers of one or more of the acrylic or methacrylic acid esters mentioned above with one or more of the following monomers: vinyl acetate, vinyl chloride, vinylidene chloride, styrene, vinyltoluene, acrylonitrile and methacrylonitrile are also more or less conventionally employed with aqueous base paints. Homopolymers of ethylene, isobutylene and styrene, and copolymers of one or more of these hydrocarbons with one or more esters, nitriles or amides of acrylic acid or of methacrylic acid or with vinyl esters, such as vinyl acetate and vinyl chloride, or with vinylidene chloride are also used. The diene polymers are generally used in aqueous base paints in the form of copolymers with one or more monomers following styrene, vinyltoluene, acrylonitrile, methacrylonitrile, and the above mentioned esters of acrylic acid or methacrylic acid. It is also quite common to include a small amount, such as ½ to 5% or more of an acid monomer in the monomer mixture used for making the copolymers of all three general types mentioned above by emulsion polymerization. Acids used include acrylic, methacrylic, itaconic, aconitic, citraconic, crotonic, maleic, fumaric, the dimer of methacrylic acid, and so on.

These aqueous dispersions may be made using one or more emulsifiers of anionic, cationic, or non-ionic type. Mixtures of two or more emulsions regardless of type may be used, except that it is generally undersirable to mix a cationic with an anionic type in any appreciable amounts since they tend to neutralize each other. Furthermore, many cationic types of emulsifier are compatible with the polymers of the invention. The amount of emulsifier may range from about 0.1 to 5% by weight of sometimes even more based on the weight of the total monomer charge. When using a persulfate type of initiator, the addition of emulsifiers is often unnecessary and this omission of the use of only a small amount, e.g., less than about 0.5%, of emulsifier, may sometimes be desirable from the cost standpoint (elimination of expensive emulsifier), and less sensitivity of the dried coating or impregnation to moisture, and hence less liability of the coated substrate to be affected by moisture, which, for instance, would produce coating less liable to swelling or softening, particularly when subjected to humid atmospheres. The average particle size or diameter of these dispersed polymers may be from about 0.03 to 3 microns or even larger. The particle size, whenever referred to herein, is the "weight average diameter". This number, expressed in microns, is determined using the ultra-centrifuge. A description of the method can be found in the Journal of Colloid Science 15, pp. 563–572, 1960 (J. Brodnyan). In general, the molecular weight of these emulsion polymers are high, e.g., from about 100,000 to 10,000,000 viscosity average, most commonly above 500,000. When used as blends with latex paint polymers, suitable proportions are 1–70%, preferably 4–25% of the polymer of this invention with 30–99%, preferably 75–96% latex polymer, solids basis. In a specific use as modifiers for latex gloss paint formulations, 1–25% preferably 1–15% of the soluble air-curing acrylic copolymer with 75–99%, preferably 85–99% of the insoluble latex polymer, results in significant flow and gloss improvements without loss of other critical paint properties. Non-air-curable alkali-soluble acrylic polymers give similar improvements, but detract from key properties such as early water resistance, block resistance, and/or recoatability. The latex polymers are insoluble in aqueous media at a pH of 3–11.

To assist those skilled in the art to practice the present invention, the following modes of operation are suggested by way of illustration, parts and percentages being by weight and the temperature in °C. unless otherwise specifically noted.

In the examples the abbreviations for monomers have the following meanings:

| BA-butyl acrylate | HEMA-hydroxyethyl methacrylate |
|---|---|
| MMA-methyl methacrylate | MAA-methacrylic acid |
| AA-acrylic acid | BMA-butyl methacrylate |
| S-styrene | EA-ethyl acrylate |
| AN-acrylonitrile | iBMA-isobutyl methacrylate |

The following abbreviations are for the diamide mer units of Formula I, wherein $R^7$ is the air-curable alkyl group of the specified fatty acid used to react with acid units in the polymer as shown in Equation 1, supra. Thus the diamide mer units are amides of whatever carboxylic acid units of the acid polymer are reacted via Equations 1 or 2.

AELAA—linseed oil acids
AEDCAA—dehydrated castor oil acids
AETAA—tung oil acids

The following abbreviations are also utilized in the examples:

MHEDCAE—N-methyl, N-hydroxyethyl dehydrated castor oil acid amide ester unit
MHETAE—N-methyl, N-hydroxyethyl tung oil acid amide ester unit In the polymer compositions recited in this specification the recitation of monomer names in the composition also represents the corresponding mer units in the polymer. Thus a polymer composition given as 30 BA/42 MMA/20 AELAA/8 AA represents a polymer having by weight:

30 parts mer units derived from butyl acrylate
42 parts mer units derived from methyl methacrylate
20 parts mer units derived from N-(β-aminoethyl)-linseed amide and acrylic acid mer units of the polymer before amidization
8 parts mer units derived from acrylic acid (and left unchanged by the amidization reaction).

EXAMPLES 1

Preparation of N-(β-aminoethyl)-linseed amide (AELA) Charges

| Ethylenediamine (99%) | 2250g |
|---|---|
| Linseed oil (alkali refined) | 1098g |

Procedure

1. Charge materials to kettle equipped with stirrer, thermometer, heater, inlets and outlets, under nitrogen atmosphere and heat to reflux (3½ hrs).
2. Hold at reflux until ester band (1750 cm$^{-1}$) in infrared spectrum disappears (1 hr).
3. Cool reaction to 45° C. and reduce pressure to 20 torr to strip excess diamine.
4. Continue stripping and apply heat until temperature reaches 50° C. (3 hrs).
5. Charge 1600 g xylene to kettle and wash xylene solution three times with 800 g of 5% KCl solution each time.
6. Heat and vacuum strip (20 torr) xylene solution until pot temperature reaches 99° C.

The product is 93% pure N-(β-aminoethyl)-linseed amide as determined by titration (2.88 meq./gm solids) and infrared and nmr spectroscopy.

EXAMPLE 2

Preparation of 2-(1-norlinseed)-2-imidazoline Reagents

| N-(β-aminoethyl) linseed amide | 60.0g (93%) |
|---|---|
| Ethylene diamine | 0.33g |
| Xylene | 30.0g |

Procedure

In a kettle equipped as in Example 1, the N-(β-aminoethyl) linseed amide from Example 1, and ethylene diamine are heated as is in xylene under a flowing nitrogen atmosphere with provision to distill volatile material. The pot temperature is raised from ambient to 245°–250° C. (ca. 40 mins.) and held at this temperature for 90 mins. A small amount of distillate (H$_2$O, ethylene diamine, xylene; total amount 5 g) is collected. After holding at 245°–250° C. the mixture is cooled and diluted with the xylene.

The product is a mixture of 52% 2-(1-norlinseed)-2-imidazoline, 12% N,N'-dilinseedoyl ethylene diamine and 37% xylene; as determined by titration (1.71 meq./gm) and infrared and nmr spectroscopy.

EXAMPLE 3

Polymer Containing Pendant Carboxyl Groups (Prepolymer) Heel Charge

| Butoxy ethanol (BC) | 584g | |
|---|---|---|
| Monomer mix and catalyst | 329.5g | |
| Monomer Mix and Catalyst | | |
| BA | 748g | 36% |
| MMA | 1048g | 50% |
| AA | 291g | 14% |
| Butoxy ethanol | 108 | |
| t-Butyl perbenzoate (85%) | 1.95g | |
| Chaser | | |
| Butoxy ethanol | 17.8g | |
| t-Butyl perbenzoate (85%) | 4.9 | |

Procedure

1. Charge heel to kettle equipped as in Example 1, and heat to 152°±2° C.
2. When temperature is reached, hold for 15 mins.
3. After hold period, grandually feel the remaining monomer mix+catalyst evenly over 4 hours maintaining 152°±2° C.
4. When feed is complete, hold 15 minutes.
5. After this hold period add chaser over 3 minutes.
6. After addition of chaser allow temperature to rise to 159° C.
7. Ten minutes after the chaser addition, cool the batch.

EXAMPLE 4

Polymer Containing Mer Units of Linseed Diamide Type From Imidazoline Charges

| | |
|---|---|
| Pendant carboxyl containing polymer 36 BA/50 MMA/14 AA, 77.5% in BC (Example 3) | 50.0 g |
| 2-(1-Norlinseed)-2-imidazoline, 52% (Example 2) | 14.0 g |
| p-Toluenesulfonic acid monohydrate | 0.09 g |
| Aqua ammonia (28%) | 3.2 g |
| Water | 21.8 g |

Procedure

1. Heat polymer to 155° C. in a kettle equipped as in Example 1.
2. Add imidazoline and acid catalyst.
3. Maintain 150°±2° C. for 3 hrs. (Sample periodically to determine progress of reaction by titration of remaining carboxyl groups).
4. After 3 hrs. at 150° C. (over 90% conversion; imidazoline titer 0.07 meq/gm, copolymer acid titer 0.76 meq/gm) cool to 105° C. and add solubilization charge, ammonia and water.

The product is a hazy solution of polymer at 53.5% in water/BC solvent which cures to an insoluble film in the presence of cobalt (II) catalysts and air. The weight composition of the product is 30 BA/42 MMA/8 AA/20 AELAA.

EXAMPLE 5

Polymer Containing Mer Units of Linseed Diamide Type From Amide-Amine Charges

| | |
|---|---|
| Pendant carboxyl containing polymer 36 BA/50 MMA/14 AA, 77.5% in BC (Example 3) | 50.0 g |
| N-($\beta$-aminoethyl)-linseed amide, 92.8% (Example 1) | 8.3 g |
| p-Toluenesulfonic acid monohydrate | 0.09 g |
| Aqua ammonia (28%) | 3.5 g |
| Water | 27.0 g |

Procedure

Same as Example 4 except reaction is held for 4 hours at 150°±2° C. instead of 3 hours. The copolymer acid titer is 0.83 meq/gm and the amine titer is 0.035 meq/gm (indicating 91% reaction) before the mixture is neutralized with ammonia and water is added.

The product is 47.1% solids, has the same appearance as that of Example 4 and cures in the same manner. The composition of the product polymer is 30 BA/42 MMA/8 AA/20 AETAA.

EXAMPLES 6, 7 and 8

Additional N-($\beta$-aminoethyl) Fatty Amides

The fatty amide of Example 6 is prepared by the method of Example 1 with the change that the molar ratio of diamine to fatty acid, calculated from the fatty acid content of the drying oil, is 6:1 rather than the 10:1 ratio of Example 1. One mole percent, based on the fatty acyl level, of sodium methoxide is employed as a catalyst. The product is 91% pure linseed amide.

In Example 7 the preparation of Example 1 is repeated with the 10:1 molar ratio of diamine to fatty acid, but the linseed oil is replaced by a mixture of 3 parts castor oil and 1 part tung oil by weight. The product is 95% pure N-($\beta$-aminoethyl)-castor/tung amide.

In Example 8 the preparation is the same as that of Example 7 except that the drying oil employed is entirely tung oil and the tung amide produced is of 93% purity.

The fatty amides of Examples 6, 7 and 8 are useful for the preparation of polymers by the process of Example 5.

EXAMPLES 9–13

Coatings

Polymers employed in Examples 9–12 are made by the prodecure of Example 5 and have the compositions given below. The polymer of Example 13 is a control having the unsaturated, air-curable alkyl functionality linked to the polymer backbone via an ester function (adjacent to the backbone) and an amide function, as contrasted with the amide-amide linkage of the polymers of the instant invention. This polymer is made by the procedure of U.S. Pat. No. 3,759,915, herein incorporated by reference. All are in solution in water/BC.

Example 9—30.4 BA/42.4 MMA/19.3 AELAA/7.9 AA (53.3% solids)
Example 10—30.4 BA/42.4 MMA/14.5 AEDCAA/4.8 AETAA/7.9 AA (53.3% solids)
Example 11—30.4 BA/40.4 MMA/14.5 AEDCAA/4.8 AETAA/9.9 AA (52.2% solids)
Example 12—30.4 BA/38.4 MMA/14.5 AEDCAA/4.8 AETAA/11.9 AA (54.2% solids)
Example 13—30 BA/42 MMA/15 MHEDCAE/5 MHETAE/8 AA (50.3% solids)

A typical paint formulation employing the polymer is:

| | Pigment Grind | Parts by Weight | |
|---|---|---|---|
| 1. | TiO$_2$, R-900HG | 108.25 | |
| 2. | Soluble Polymer | 50.75 | (53.3% T.S.) |
| 3. | H$_2$O | 91.00 | |
| Let-Down | | | |
| 1. | Polymer, remainder of | 109.20 | (53.3% T.S.) |
| 2. | H$_2$O | 58.28 | |
| 3. | 90/10-H$_2$O/BC | 132.00 | |
| 4. | C$^{++}$ Naphthenate (6%) | 1.71 | |

Pigment grinds are prepared in a Cowles Dissolver utilizing portions of soluble polymer and H$_2$O as dispersant and diluent respectively. The let-down phase consists of ordered additions of the remainder of soluble polymer (to obtain a pigment volume percentage of 25), H$_2$O (to obtain a 90 H$_2$O/10 cosolvent ratio), 90 H$_2$O/10 2-butoxy ethanol (to obtain a Krebs viscosity of 85 K.U.) and cobalt drier (0.1% Active Co$^{++}$ on soluble resin solids).

The paints are allowed to equilibrate for one day prior to brushouts and drawdowns. Viscosity and pH are measured initially and after one dry of equilibration, just prior to the following drawdowns: (1) for alkaline scrub test: 7-mil U-caster over annealed Bonderite aluminum panels (for the baked, 16 hr. at 60° C. samples) and over black vinyl charts (for the weeks in a CTR-constant temperature room at 25° C. and 50% relative humidity-samples); (2) for block and print resistance tests: 3-mil Bird TM caster over Penopac TM form 1B; (3) for hardness: 5-mil caster bar over glass slides. Brushouts are over Penopac TM form 12H (spread rate chart). All charts and panels are brushed out and drawdown in a CTR to eliminate effects of varying temperature and humidity. Those charts and slides to be placed in a 60° C. oven are given 4 hours CTR-dry before placement in the oven. The baked charts are then allowed to equilibrate in the CTR for one day before testing. Test conditions are: (1) for alkaline scrub testing: four layers of cheesecloth are saturated with 1% Tide ® solution, with a one pound scrub boat, for 500 cycles on Gardner ® Automatic Straight-Line Scrub Machine; (2) block resistance: 1 kg over 1 sq. inch for 20 minutes at 60° C., followed by 30 minutes equilibration in CTR with weight on; (3) print resistance: 0.5 kg on two layers of cheesecloth for 60 minutes at 60° C., followed by equilibration as for block resistance determination; (4) hardness: Automatic Tukon Tester giving Knoop Hardness Numbers (KHN). Test results are in the following table.

Paint film gloss values are determined at 20° and 60° angles of reflection on a Hunter Laboratory D48D glossmeter. Flow is rated subjectively on the brushout samples on a 0 to 10 scale; 0 very poor flow with numerous deep brushmarks, 10—excellent flow, no brushmarks, smooth film. Block resistance is rated in terms of the difficulty in pulling the two painted surfaces apart; 0—strong bonding, 10—no sticking. Print resistance is rated by the depth of the cheesecloth imprint; 0—deep imprint, 10—no imprint.

|  | Paint Data | | | | |
|---|---|---|---|---|---|
| Example | 9 | 10 | 11 | 12 | 13 |
| Paint Properties | | | | | |
| Pig. Vol. Conc. | 25 | 25 | 25 | 25 | 25 |
| Volume Solids | 23.3 | 23.2 | 22.7 | 23.7 | 23.4 |
| Brushout Gloss 20°/60° | 48/83 | 47/78 | 40/79 | 42/75 | 40/79 |
| Flow | 9 | 9 | 9 | 9 | 9 |
| pH, Initial/ Equil. 24 hr | 8.6/8.4 | 8.4/8.3 | 8.4/8.2 | 8.3/8.2 | 8.4/8.2 |
| Visc, K.U., Initial/ Equil. 24 hr | 84/86 | 85/86 | 83/86 | 86/87 | 83/83 |
| Baked Properties (16 hr 60° C.): | | | | | |
| Block/Print | 3/5 | 5/7 | 1/7 | 5/7 | 3/7 |
| KNH | 4.28 | 5.36 | 9.13 | 7.41 | 5.84 |
| Pre-scrub Gloss, 20°/60° | 59/68 | 51/80 | 50/80 | 57/79 | 51/80 |
| Post-scrub Gloss, 20°/60° | 40/81 | 50/78 | 49/80 | 52/78 | 48/80 |
| 2 Week CTR Properties: | | | | | |
| Block/Print | 0/6 | 0/7 | 0/6 | 3/6 | 0/6 |
| KNH | 6.33 | 5.52 | 10.79 | 8.69 | 4.56 |
| Pre-scrub Gloss, 20°/60° | 41/80 | 37/74 | 35/72 | 26/87 | 35/75 |
| Post-scrub Gloss, 20°/60° | 37/80 | 37/78 | 33/72 | 25/87 | 33/74 |

The film hardness developed by the paints employing the polymers of the instant invention is particularly interesting. Hardness values in this range are often desirable but are not attainable from other water based systems based on latex dispersions. High gloss paints based on latex dispersions have previously been limited in hardness, usually Tukon values about 1 or 2, because of the necessity of being film-forming at room temperature. After two weeks in the constant temperature room (CTR), at 25° C. and 50% relative humidity the hardness of each film is greater than that of the control and is also greater than that of the same film baked at 60° C. for 16 hours.

The gloss of the paints is very good, particularly in depth of gloss. This is to be expected from the high values, particularly of 20° gloss, reported above. Normal aqueous latex paints have 60° gloss values about 65 and 20° values about 20-25. Paints made employing both these polymers, perhaps to serve a secondary function such as dispersant in the grind, and conventional paint latex polymers have intermediate gloss values thus are still superior to ordinary latex paints.

Latex paints are normally too low in brush drag to permit high film build because they exhibit marked shear-thinning rheological behavior. The paints of Example 9-12 are less shear-thinning so produce high film build thus the very desirable "one coat coverage".

EXAMPLES 14-17

Caulks

The caulk formulation, employing the drying polymers, is:

| Component | Parts by Weight |
|---|---|
| CaCO$_3$, Duramite (Thompson-Weinman & Co.) | 587.3 |
| Thixatrol$^R$ ST (N.L. Industries) | 51.6 |
| TiO$_2$, Ti-Pure R-901$^R$ (Du Pont) | 25.5 |
| Polymer at 83.0% solids | 614.8 |
| Cobalt naphthenate (6%) | 0.65 |
| Zinc naphthenate (8%) | 3.2 |
| Silane A-174 (Union Carbide) | 1.4 |
| Xylene | 22.2 |

In preparing the caulk the first three items are charged to a high shear, low speed mixer, such as a double blade sigma or a planetary type mixer, and mixed for several minutes. The polymer solution is charged to the mixer and mixed for 45 minutes. The four remaining components are premixed, the resulting mix is charged to the mixer and mixed for ten minutes. Thixotrol ST is a proprietary slump control thixotrope. Silane A-174 is 2methacryloxypropyltrimethoxysilane.

| Example | Prepolymer[1] Drying Oil | Drying Oil | Viscosity (cps.) | Solids | Reaction[2] |
|---|---|---|---|---|---|
| 17 | 95.3/4.7 | MHELA[3] | 100,000 | 86.5% | 88% |
| 14 | 97.2/2.8 | AELA | 140,000 | 86.6% | 88% |
| 15 | 95.3/4.7 | AELA | 154,00 | 86.3% | 88% |
| 16 | 94.3/5.7 | AELA | 150,000 | 86.4% | 85% |

[1]All samples are prepared from the same batch of an acrylic prepolymer having 1.5% AA mer units.
[2]Reaction of functional drying oil with copolymer as indicated by titration data.
[3]The polymer of Example 17 is a control wherein the bonding of the curable alkyl is the same as in Example 13, the polymer being made by the same process as that of Example 13.

| Example | 14 | 15 | 16 | 17 |
|---|---|---|---|---|
| Initial Caulk Consistency | 6.0 | 8.0 | 9.0 | 4.0 |
| 50° C. slump | 3/16" | 2/16" | 3/16" | 3/16" |
| Tack Free Time, hrs. | <72 | <48 | <48 | OK 72 hrs. |
| Aluminum Cracking 3 wk. 70° C. | Pass | Pass | Pass | Pass |
| Mechanical Properties | | | | |

-continued

| Example | 14 | | | 15 | | | 16 | | | 17 | | |
|---|---|---|---|---|---|---|---|---|---|---|---|---|
| 4 wk. 70° C. cure | | | | | | | | | | | | |
| Tensile strength, psi | 66 | | | 78 | | | 76 | | | 71 | | |
| % Recovery | 62 | | | 67 | | | 66 | | | 67 | | |
| % Elongation, max. | 357 | | | 230 | | | 190 | | | 223 | | |
| % Elongation, break | 397 | | | 260 | | | 203 | | | 253 | | |
| Shore A Hardness | 38 | | | 42 | | | 40 | | | 46 | | |
| Adhesion to Aluminum | | | | | | | | | | | | |
| Cure, wks. 70° C. | 3 | 3 | 5 | 3 | 3 | 5 | 3 | 3 | 5 | 3 | 3 | 5 |
| Dry/Wet | D | W | D | D | W | D | D | W | D | D | W | D |
| Adhesion, lbs/in | 10.5 | 10.1 | 7.9 | 6.1 | 6.3 | 5.3 | 6.1 | 5.5 | 4.9 | 5.2 | 6.4 | 4.9 |
| Failure | LC/C | LC/C | LC | LC | 1A/LC | LC | LC | 1A/LC | LC | CP | CP | LC |

The tests used in evaluating the caulking compounds or elastomeric sealants as reported in the above table are:

Initial Caulk Consistency. A sample of caulk and a 6 ounce polyethylene cartridge are conditioned for 24 hours at 25° C. and 50% relative humidity. The cartridge, with plunger in place is then filled to capacity with the caulk, from the nozzle end and placed in an air-powered Semco caulking gun. The caulk is gunned, at 50 psi, through the 0.44 inch diameter orifice. The consistency is the time, in seconds, required to empty the cartridge.

50° C. Slump. A sample of caulk, stored for 24 hours at 25° C. and 50% RH is used to fill a rectangular 302 stainless steel channel ($\frac{3}{4}'' \times 6'' \times \frac{1}{2}''$ deep) and with bottom surface extended a further 2 inches at one end; the channel having been conditioned for one hour. The filled channel is positioned with the long dimension vertical and the 2 inch extension down, in an oven at 50° C. At the end of one hour the sag of the caulk at the lower end of the channel is measured to the nearest 1/16 of an inch.

Tack-Free Time. A sample of caulk is stored for 24 hours at 25° C. and 50% RH is used to fill a brass frame ($1\frac{1}{2}'' \times 5'' \times \frac{1}{4}''$ deep) centered on an aluminum plate ($3'' \times 6'' \times$ CA. 20 gauge. Excess caulk is struck off and a thin knife is then run along the inside edge of the frame to free the caulk whereupon the frame is removed. Two such specimens are prepared and cured at 25° C. and 50% RH. The samples are tested for tack every 24 hours by placing a 4 mil polyethylene strip about $2'' \times 4''$ on the caulk and overlaying the strip with a 30 gram brass block $1'' \times 1\frac{5}{8}'' \times \frac{1}{8}''$ thick for 30 seconds. The brass block is then removed and the polyethylene strip is withdrawn at right angles to the caulk. The caulk is tack-free if the film pulls away without any of the caulk adhering.

Aluminum Cracking. In this test an aluminum channel $\frac{1}{2}'' \times 6'' \times \frac{3}{8}''$ deep is filled with caulk and cured for 3 weeks at 70° C. The sample is then observed for cracks; cracking is evidence of failure.

Mechanical Properties. A sample of caulk is stored for 24 hours at 25° C. and 50% RH. A brass frame with inside dimensions $3'' \times 5'' \times \frac{1}{4}''$ deep is placed on a Teflon-coated steel plate and filled with the conditioned caulk. Excess compound is struck off and a thin knife is run along the inside edge of the frame to free the caulk, and the frame is removed. The prepared caulk specimen is then cured for 4 weeks at 70° C. The specimen is cut with a dumbbell-shaped die measuring 3 inches long by $\frac{3}{4}$ inch wide and having a neck $\frac{1}{4}$ inch wide at 0.75" long. An Instron Tensile Tester is then used to determine the tensile and elongation properties of the dumbbell-shaped specimen at 25° C. and 50% RH at the following setting:

| Crosshead speed | 0.2 in./min. |
|---|---|
| Chart speed | 0.2 in./min. |
| Gauge length | 0.5-in. opening |

Results can be computed with the following formulas:

Tensile Strength $$T = \frac{f}{tw}$$

where
T = tensile strength in p.s.i.
f = force at break in pounds
w = sample width in inches
t = sample thickness in inches Elongation $$E = \frac{100 (l - l_0)}{l_0}$$

where
E = percent elongation
$l_0$ = gauge length
l = length of sample at break or at maximum force for break or maximum elongation respectively.

For a recovery measurement the same type of sample is used and the Instron machine is set up to extend the sample 25% of the gauge length and automatically return it to the gauge length. The percent extension at which the force becomes zero on the return stroke and the percent recovery is calculated by dividing this value by 25% and multiplying the result by 100.

Shore A Hardness. The test speciment is prepared in the same manner as that for the tack-free time test. Two specimens are cured for 14 days at 25° C. and 50% RH following which Shore "A" hardness measurements are made with a Shore Durometer. Three readings are made on each specimen and the average reported. Readings are by the instantaneous method using one kilogram pressure.

Adhesion to Aluminum. A 180°-peel adhesion test is performed on caulk samples adherred to clean aluminum panels and cured for 3 or 5 weeks at 70° C. One set, indicated by W in the tables, is cured for 3 weeks at 70° C. completely immersed in distilled water. The results recorded are an average of the values obtained on 5 strips tested. The failures are described as LC-light cohesive, C-cohesive, A-adhesive with the fraction showing adhesive failure being indicated by a decimal number, and CP-cohesive peak, a failure showing a peak in the force elongation curve in cohesive failure.

In summary, the data in the above table show the surprisingly good balance of caulk performance properties (tack-free time, adhesion, hardness tensile strength, recovery and elongation) of Examples 14–16. Caulk formulations generally sacrifice tack free time for elongation or vice-versa, thus are either excessively brittle or tend to have considerable dirt pickup soon after application or are mediocre in both. The caulks of Examples 14–16 are both low in tack free time and high in elongation.

A more complete description of test procedures for evaluating caulks and sealants is given in RESIN REVIEW, 1966, Vol. XVI, No. 3, published by the Rohm and Haas Company, Philadelphia, Pa., incorporated herein by reference.

We claim:

1. An air-curable polymer of ethylenically unsaturated monomers wherein the polymer comprises diamide mer units of the formula

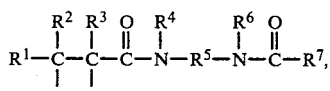

$R^1$ and $R^3$ individually being H, lower alkyl, $-COOR^8$, $-CONH_2$, $-CH_2COOR^9$, $-CN$ or halogen;

$R^2$, $R^4$, $R^6$, $R^8$, and $R^9$ individually being H or lower alkyl;

$R^5$ being alkylene comprising two to 18 carbon atoms in a linear linkage between the two nitrogen atoms; and $R^7$ being unsaturated, air-curable alkyl.

2. The polymer of claim 1 comprising up to 40% by weight mer units comprising carboxylic acid groups or salts thereof.

3. The polymer of claim 2 wherein $R^1$, $R^2$, $R^4$ and $R^6$ are H, $R^7$ comprises up to about 18 carbon atoms and $R^3$ is H or methyl.

4. The polymer of claim 3 wherein $R^5$ is $(CR_2^{10})_n$ wherein $R^{10}$ is $-H$ or $-CH_3$ and n is 1, 2 or 3 and the diamide mer units comprise 0.1% to 60% of the polymer, by weight.

5. The polymer of claim 4 comprising up to 99% by weight of mer units of esters of acrylic acid or methacrylic acid, vinyl hydrocarbons, unsaturated nitriles, and vinyl esters of fatty acids.

6. The polymer of claim 5 comprising by weight 1 to 15% acrylic or methacrylic acid mers, 60 to 98.5% $C_1$-$C_8$ esters of acrylic or methacrylic acids, or vinyl aromatic hydrocarbon mers and 0.5 to 30% of the diamide mers.

7. The polymer of claim 6 wherein the $R^7$ alkyl is the residue of one or more of tung oil, linseed oil, dehydrated castor oil, safflower oil, conjugated safflower oil, soybean oil and oiticica oil acids.

8. A method of preparing the polymer of claim 1 comprising preparing a mixture comprising a carboxyl-containing polymer and an N-($\beta$-aminoethyl)amide comprising an unsaturated, air-curable alkyl and heating the mixture to cause reaction forming the polymer.

9. A method of preparing the polymer of claim 1 comprising preparing a mixture comprising a carboxyl-containing polymer and an an imidazoline having in the 2 position an unsaturated, air-curable alkyl and heating the mixture to cause reaction forming the polymer.

10. A caulking composition having a dough-like consistency comprising about 10% to 80% solids by weight of the polymer of claim 1 and about 20% to 90% solids by weight of a filler.

11. A caulking composition having a dough-like consistency comprising about 10% to 80% solids by weight of the polymer of claim 7 and about 20% to 90% solids by weight of a filler.

12. The composition of claim 11 in which said $T_g$ is below $-10°$ C.

13. The composition of claim 10 in which an organic solvent is present, and the polymer is predominantly an ester of acrylic acid and an alkanol having one to four carbon atoms, with, in smaller amounts, an ester of methacrylic acid and an alkanol having one to four carbon atoms, methacrylonitrile or acrylonitrile, and methacrylic acid or acrylic acid.

14. The composition of claim 11 in which an organic solvent is present, and the polymer is predominantly an ester of acrylic acid and an alkanol having one to four carbon atoms, with an ester of methacrylic acid and an alkanol having one to four carbon atoms, methacrylonitrile or acrylonitrile, and methacrylic acid or acrylic acid in smaller amounts.

15. The composition of claim 11 in which said fatty acids are predominantly at least one of oleic, linoleic, or linolenic acid.

16. The composition of claim 11 containing a silane selected from the group consisting of vinyltriethoxysilane, $\gamma$-methacryloxypropyl-trimethoxysilane, $\gamma$-mercaptopropyltrimethoxysilane, $\gamma$-glycidoxypropyltrimethoxysilane, $\beta$-(3,4-epoxycyclohexy)ethyltrimethoxysilane, $\gamma$-aminopropyltriethoxysilane, and N-(dimethyloxymethylsilylisobutyl)ethylenediamine.

17. The composition of claim 10 in which the backbone polymer is derived from monomers including 0 to 90 percent hard monomers and 75 percent to 99.75 percent soft monomers.

18. An article comprising the caulking composition of claim 10.

19. A method of caulking comprising the steps of preparing the caulk of claim 10 and applying said caulk to a substrate.

20. A coating, binding or adhesive composition comprising a solution or dispersion of the polymer of claim 1 in an aqueous or non-aqueous solvent and optionally an effective amount of a drier.

21. The polymer of claim 7 comprising up to 40% by weight mer units comprising carboxylic acid groups or salts thereof.

22. A coating composition of claim 20 in which the polymer composition contains polymer units of:

(a) 0–50 parts by weight of a monomer selected from esters of acrylic acid or methacrylic acid, which when homopolymerized gives a high molecular weight polymer having a $T_g$ of between about 0° C. and $-80°$ C.

(b) 20–70 parts by weight of a monomer selected from esters of acrylic acid or methacrylic acid, vinyl aromatic hydrocarbons and unsaturated nitriles which when homopolymerized gives a high molecular weight polymer having a $T_g$ between 20° C. and 120° C.

(c) 5–30 parts of an ethylenically unsaturated carboxylic acid, optionally with up to 20 parts of a different ethylenically unsaturated monomer which confers hydrophilicity to the polymer and enhances its solubility in aqueous liquids, the quantity of ethylenically unsaturated acid being between about 0.6 and 2.5 meq/g. of polymer, and (d) 10–50 parts by weight of the diamide mer units and the total of (a), (b), (c), and (d) being 100.

23. The composition of claim 22 in which (a) is at least 10 parts and is selected from one or more of ethyl acrylate, butyl acrylate, 2-ethylhexyl acrylate, sec-butyl acrylate, isobutyl acrylate, and isopropyl acrylate, (b) is selected from one or more of methyl methacrylate, styrene, ethyl methacrylate, acrylonitrile, butyl methacrylate, isobutyl methacrylate, and vinyl toluene, (c) is selected from one or more of acrylic acid, methacrylic acid, maleic acid, and itaconic acid, and is present in an amount of from 8 to 15 parts, with 0 to 20 parts of hydroxyethyl or hydroxypropyl acrylate or methacrylate or a mixture of these, (d) is present in the amount of between about 20 and 50 parts, the polymer consisting essentially of (a), (b), (c), and (d).

24. The composition of claim 23 in which the diamide mer units are such that n is 2, $R^1$, $R^4$ and $R^6$ are H and $R^7$ is the residue of one or more of the drying oil acids selected from tung oil acids, linseed oil acids, dehydrated castor oil acids, safflower and conjugated safflower oil acids, soybean oil acids, and oiticica oil acids, the Mv is between about 20,000 and 80,000 and the thickness of the cured coating being between about 0.1 and 10 mils.

25. The composition of claim 24 in which a blend of said drying oil acids is utilized which contains 50–90% by weight of dehydrated castor, safflower, conjugated safflower, or soybean oil acids, or a mixture thereof, with 10–50% by weight of tung oil acids, the $T_g$ of a cured film of the polymer being less than about 80° C., and the calculated $T_g$ of the backbone polymer being below about 50° C.

26. The composition of claim 20 in which the polymer contains units consisting essentially of:

(e) 45–90 parts by weight of butyl methacrylate (f) 5–20 parts of an ethylenically unsaturated carboxylic acid, the quantity of ethylenically unsaturated acid being between about 0.6 and 2.5 meq/g. of polymer, and (g) 10–50 parts by weight of the diamide mer units and (h) 0 to 20 parts of a different ethylenically unsaturated monomer which confers hydrophilicity to the polymer and enhances its solubility in aqueous liquids, the total of (e), (f), (g), and (h) being 100.

27. The composition of claim 26 in which (f) is selected from one or more of acrylic acid, methacrylic acid, maleic acid, and itaconic acid, and the Mv is between about 10,000 and 200,000.

28. The composition of claim 27 in which the diamide mer units are such that n is 2, $R^2$, $R^4$ and $R^6$ and H and $R^7$ is the residue of one or more of the drying oil acids selected from tung oil acids, linseed oil acids, dehydrated castor oil acids, safflower and conjugated safflower oil acids, soybean oil acids, and oiticica oil acids and the Mv is between about 20,000 and 80,000.

29. The composition of claim 28 in which a blend of said drying oil acids is utilized which contains 50–90% by weight of dehydrated castor oil acids, safflower or conjugated safflower acids, or a mixture thereof, with 10–50% by weight of tung oil acids.

30. A method of coating, bonding or adhering comprising the steps of applying the composition of claim 20 to a substrate and curing the composition.

31. A method of coating, bonding or adhering comprising the steps of applying the composition of claim 21 to a substrate and curing the composition.

32. A method of coating comprising the steps of applying the composition of claim 22 to a substrate and curing the composition.

33. A method of coating comprising the steps of applying the composition of claim 25 to a substrate and curing the composition.

34. A method of coating, bonding or adhering comprising the steps of applying the composition of claim 26 to a substrate and curing the composition.

35. A method of coating, bonding or adhering comprising the steps of applying the composition of claim 29 to a substrate and curing the composition.

36. An article of manufacture prepared by the method of claim 30.

37. An article of manufacture prepared by the method of claim 31.

38. An article of manufacture prepared by the method of claim 32.

39. An article of manufacture prepared by the method of claim 33.

40. An article of manufacture prepared by the method of claim 34.

41. An article of manufacture prepared by the method of claim 35.

42. A polymer composition consisting essentially of the following polymer units in the amounts of:

(a) 10–50 parts by weight of one or more of ethyl acrylate, butyl acrylate, 2-ethylhexyl acrylate, sec-butyl acrylate, isobutyl acrylate, and isopropyl acrylate, (b) 20–70 parts by weight of one or more of methyl methacrylate, ethyl methacrylate, butyl methacrylate, sec-butyl methacrylate, t-butyl methacrylate, isopropyl methacrylate, hydroxyethyl methacrylate, acrylonitrile, isobutyl methacrylate, styrene, and vinyl toluene, (c) 8–15 parts by weight of one or more of acrylic acid, methacrylic acid, maleic acid, and itaconic acid, and (d) 5–60 parts by weight of units of the formula:

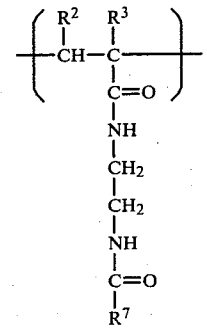

$R^3$ individually being H, lower alkyl, halogen, —CN, —CH$_2$COOR$^9$, or —COOR$^8$; $R^2$, $R^8$ and $R^9$ individually being H or lower alkyl; $R^7$ being unsaturated, air curable alkyl; the total of (a), (b), (c), and (d) being 100, the quantity of (c) being 0.5 to 6 meq/g. of polymer and being sufficient, when in the form of salt groups with a volatile amine or ammonia, to confer water solubility upon the polymer, the Mv of the polymer being between about 5,000 and 200,000 the polymer being oxidatively curable by air, the residue

being a drying oil acid residue derived from one or more of tung oil acids, linseed oil acids, dehydrated castor oil acids, safflower oil acids, conjugated safflower oil acids, soybean oil acids, and oiticica oil acids, the $T_g$ of a cured film of the polymer being between about 10° and 80° C.

43. The polymer of claim 42 in which said residue is derived from a blend of 50–90% by weight of one or more of dehydrated castor oil acids, safflower oil acids, conjugated safflower oil, or soybean oil acids, with 10–50% by weight of tung oil acids.

44. A composition comprising the polymer of claim 42 blended with an insoluble latex polymer, the blend proportions being 1–70% of the polymer of claim 42 to 30–99% of the latex polymer on a solids basis.

45. The composition of claim 44 the blend proportions being 1–15% of the polymer of claim 42 to 85–99% of the latex polymer.

46. A method of coating a substrate comprising applying the composition of claim 44 to a substrate and curing the same.

47. An article prepared by the method of claim 46.

* * * * *